US012158614B2

(12) United States Patent
Jia et al.

(10) Patent No.: US 12,158,614 B2
(45) Date of Patent: *Dec. 3, 2024

(54) MEMS-BASED VARIABLE OPTICAL ATTENUATOR ARRAY

(71) Applicant: II-VI Delaware, Inc., Wilmington, DE (US)

(72) Inventors: Chunyan Jia, Fuzhou (CN); Peng Xiao, Fuzhou (CN); Zhihua Song, Fuzhou (CN); Yingying Liu, Fuzhou (CN); Jin'e Hua, Fuzhou (CN)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/344,015

(22) Filed: Jun. 29, 2023

(65) Prior Publication Data

US 2023/0341631 A1    Oct. 26, 2023

Related U.S. Application Data

(63) Continuation of application No. 17/663,135, filed on May 12, 2022, now Pat. No. 11,733,462, which is a
(Continued)

(30) Foreign Application Priority Data

Jan. 16, 2020    (CN) .......................... 202010056833.5

(51) Int. Cl.
*G02B 6/35*    (2006.01)
*G02B 6/26*    (2006.01)

(52) U.S. Cl.
CPC ........... *G02B 6/3594* (2013.01); *G02B 6/266* (2013.01); *G02B 6/3596* (2013.01)

(58) Field of Classification Search
CPC .... G02B 6/3594; G02B 6/266; G02B 6/3596; G02B 6/3512; G02B 26/0833
See application file for complete search history.

(56) References Cited

U.S. PATENT DOCUMENTS 10,429,591 B2    10/2019    Lee et al.
11,733,462 B2 *   8/2023    Jia ........................ G02B 6/3594
                                                                    385/140
(Continued)

FOREIGN PATENT DOCUMENTS

CN    103885122 A    6/2014
CN    208140979 U    11/2018
CN    208636460 U    3/2019

*Primary Examiner* — John Bedtelyon
(74) *Attorney, Agent, or Firm* — Blank Rome LLP

(57) ABSTRACT

The present disclosure provides a MEMS -based variable optical attenuator (VOA) array, sequentially including an optical fiber array, a micro-lens array, and a MEMS-based micro-reflector array to form a VOA array having several optical attenuation units. The MEMS-based micro-reflectors can change the propagation direction of a beam, causing a misalignment coupling loss to the beam and thereby achieving optical attenuation, with a broad range of dynamic attenuation, low polarization dependent loss and wavelength dependent loss, good repeatability, short response time (at the millisecond level), etc. Arrayed device elements are used as assembly units of the present disclosure, and the assembly of arrayed elements facilitates tuning in batches. Accordingly, automation levels are improved, and the production costs are reduced.

20 Claims, 4 Drawing Sheets

Related U.S. Application Data continuation of application No. 17/248,223, filed on Jan. 14, 2021, now Pat. No. 11,360,273.

(56) References Cited

U.S. PATENT DOCUMENTS

| | | |
|---|---|---|
| 2004/0037493 A1 | 2/2004 | Lee et al. |
| 2004/0076366 A1 | 4/2004 | Yun et al. |
| 2011/0150389 A1 | 6/2011 | Hu et al. |

* cited by examiner

MEMS-BASED VARIABLE OPTICAL ATTENUATOR ARRAY

CROSS-REFERENCE TO RELATED APPLICATIONS

This application is a continuation of U.S. patent application Ser. No. 17/663,135, filed May 12, 2022, which is a continuation of U.S. patent application Ser. No. 17/248,223, filed Jan. 14, 2021, which claims priority to Chinese Patent Application No. 202010056833.5 filed on Jan. 16, 2020, the content of which is relied upon and incorporated herein by reference in its entirety.

TECHNICAL FIELD

The disclosure relates generally to the field of optical fiber communications, in particular to a MEMS-based variable optical attenuator array.

BACKGROUND

Variable Optical Attenuators (VOAs) are a type of important optical passive devices used in optical fiber communication systems. The VOA device regulates an intensity of optical signals in real time by attenuating an optical power. In one type of application, the VOA device can be used in an ultra-long distance Dense Wavelength Division Multiplexing (DWDM) system, where environmental factors can cause changes to optical power in a channel In such a system, the VOA device can perform instant signal compensation based on its own sensitivity and reliability, thereby ensuring the accuracy and authenticity of information transmission.

In other applications, the VOA device can be readily integrated with other optical devices, such as an Erbium Doped Optical Fiber Amplifier (EDFA), through optical fiber connections. The VOA device can perform gain flattening. Additionally, the VOA device with the other optical devices can form modular products with more complex functions, which advances the development of high-order photoelectric modules. In addition, the VOA device may also be directly used for overload protection of optical receivers, as well as for measurement and calibration of instrumentation, such as optical power meters. Overall, the VOA devices have become one of the optical passive devices most extensively used in optical communication systems, and the huge application market has strongly advanced the manufacturing and development of VOA devices.

At present, there are many types of manufacturing technologies for realizing VOA devices, including conventional mechanical technologies, planar optical waveguide technologies, liquid crystal technologies, magneto-optical technologies, micro-electromechanical systems (MEMS), and the like. Of these, MEMS-based VOA devices have been used in a large number of products and large-scale applications because the MEMS-based VOA devices have advantages of small mechanical dimensions, good performance stability, easiness for integration, and suitability for large-scale production, etc. Along with the development of DWDM systems and the tremendous potential market demands for Reconfigurable Optical Add/Drop Multiplexer (ROADM) technology that can be obtained through flexible upgrade, miniaturization and multi-channel integration of a VOA device may become one of the targets and requirements of next-step development of optical transmission systems.

SUMMARY

Directed towards meeting the above-described technical requirements, the present disclosure provides a MEMS-based variable optical attenuator (VOA) array having simplified control principles and fast response speed. Additionally, the construction of the MEMS-based VOA array allow the array to readily produced using automated production.

Directed towards the above-described goals, the present disclosure includes the following technical solutions.

As disclosed herein, a MEMS-based variable optical attenuator array, sequentially includes an optical fiber array, a micro-lens array, and a MEMS-based micro-reflector array to form a VOA array having several optical attenuation units.

In some examples, the optical fiber array includes optical fibers arranged in pairs, with each pair of optical fibers including an incoming optical fiber and an outgoing optical fiber arranged correspondingly. Lenses in the micro-lens array can be distributed at equal distances with a high precision. A distance between adjacent lenses can be equal to a distance between adjacent pairs of optical fibers. Reflectors in the MEMS-based micro-reflector array can be arranged at equal or same distances and can be arranged coaxially with respect to the lenses in the micro-lens array and the pairs of optical fibers. The reflectors can change the propagation direction of light beams, causing a misalignment coupling loss to the beams and thereby achieving attenuation of specific incident light.

In certain examples, the optical fiber array is a bare optical fiber array or an optical fiber pigtail array, such as a dual optical fiber pigtail array.

In another example, micro-lenses included in the micro-lens array are cylindrical lenses, which can be G-lenses or C-lenses.

In other examples, the micro-lens array is a stamped piece, a silicon-based etched piece, or an assembly obtained by using or including a positioning device.

In some examples, the variable optical attenuator array has the advantage of being tuned in batches and finally assembled inside an encapsulation structure.

In certain examples, the encapsulation structure includes an outer encapsulation tube and a base. One end of the outer encapsulation tube is integrally connected to the base, and another end of the outer encapsulation tube has a through hole for incoming optical fibers and outgoing optical fibers to pass through. The outside of the base is fixed with several groups of PINs, each group of PINs are connected to a MEMS chip in the MEMS-based micro-reflector array and used for providing a drive voltage for the MEMS chip, thereby changing angles of reflective lenses.

In another example, a buffer gasket is provided between the base and MEMS chip, and the buffer gasket provides protection against vibration and shock for the MEMS-based micro-reflector array.

In other examples, gold-tin soldering, electric resistance welding, or adhesive bonding is used to connect one end of the outer encapsulation tube to the base so as to assemble the two into one integral piece.

In some examples, the through hole on another end of the outer encapsulation tube is encapsulated with adhesive.

By using the above-described technology, the present disclosure provides the following technical effects.

In some examples of the present disclosure, the VOA array includes a combination of a MEMS-based micro-reflector and a collimating lens to realize controllable attenuation modulation of optical signals, having broad range of dynamic attenuation, low Polarization Dependent Loss (PDL) and Wavelength Dependent Loss (WDL), good repeatability, short response time (at the millisecond level), etc.

In certain examples of the present disclosure, the VOA array sequentially includes a chip array, a lens array, and an optical fiber array distributed at equal distances, e.g., with a high precision, which contains a relatively small number of types of device elements and a relatively small number of parameters to be tuned during the assembly. The assembly of arrayed elements may facilitate tuning in batches. Accordingly, automation in the production of the arrays may be improved, and the production costs may be reduced.

BRIEF DESCRIPTION OF THE DRAWINGS

The present disclosure will be further described in detail below with reference to embodiments and accompanying drawings in which.

Figure 1A:
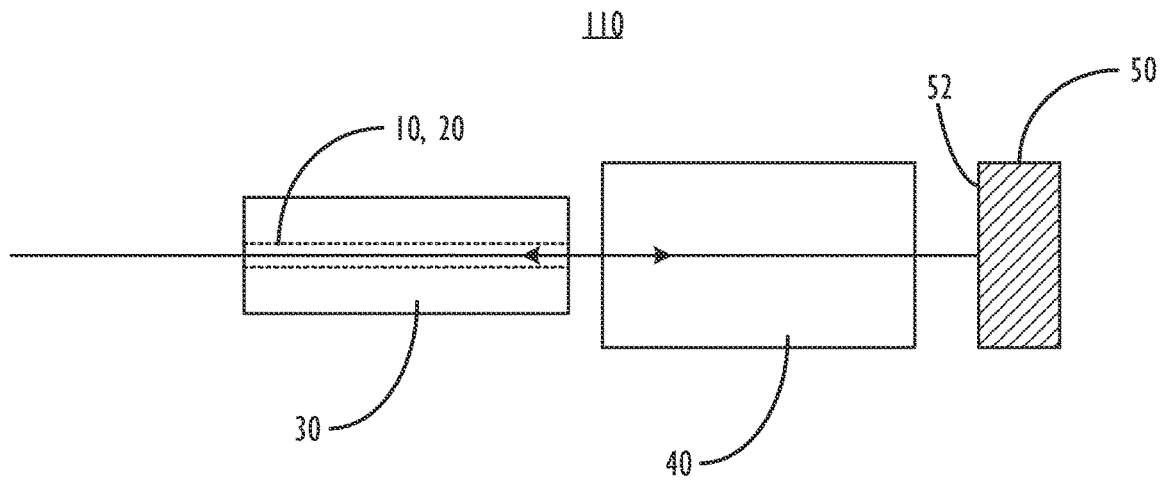
FIG. 1A illustrates a schematic diagram of an example individual optical attenuation unit according to the present disclosure from a side view.

The numerals in the drawings representing the corresponding relationships include: 10—incoming optical fiber, 20—outgoing optical fiber, 30—optical fiber positioning device, 40—lens, 50—MEMS-based micro-reflector, 60—optical fiber array, 70—micro-lens array, 80—MEMS-based micro-reflector array, 90—dual optical fiber pigtail array, 130—PIN, 125—buffer gasket, 124—base, 122—outer encapsulation tube, 129 through-hole having adhesive.

DETAILED DESCRIPTION

Figure 1B:
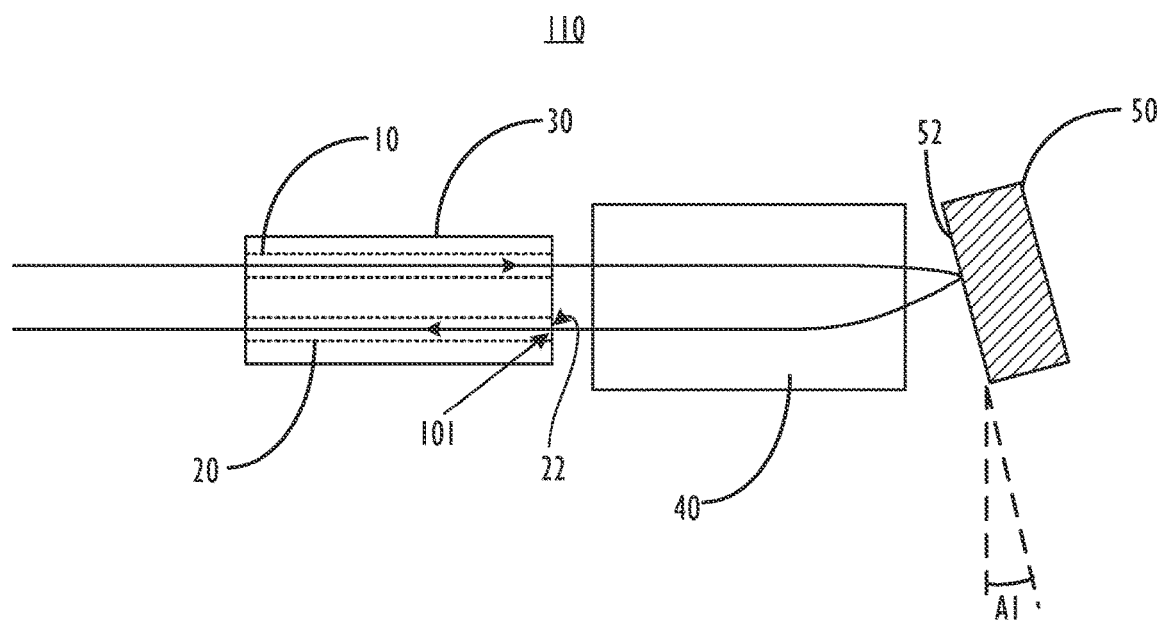
FIG. 1B illustrates the example individual optical attenuation unit of FIG. 1A from a top view.

FIGS. 1A-1B illustrate schematic diagrams from a side view and a top view of an example individual optical attenuation unit 110 for use in an example micro-electro-mechanical system (MEMS)-based variable optical attenuator (VOA) array of the present disclosure. As shown, an incoming optical fiber 10 and an outgoing optical fiber 20 are fixed on an optical fiber positioning device 30. During operation, an incoming optical signal enters a lens 40 via the incoming optical fiber 10. The originally divergent optical signal is converted, after passing through the lens 40, to a collimated light beam that irradiates to a reflection region of a MEMS-based micro-reflector 50. When there is no drive voltage to the reflector 50, an end surface 52 of the MEMS-based micro-reflector 50 is essentially parallel to the end surfaces of the optical fibers 10, 20. In this case, the incoming light beam is reflected by the MEMS-based micro-reflector 50, and further outputted in a coupled way via the outgoing optical fiber 20. Accordingly, an energy gap or energy difference between the incoming light and the outgoing light is given directly by the attenuation inherent to the attenuation device unit 110 itself.

When a certain drive voltage is provided to a chip of the MEMS-based micro-reflector 50, the reflection surface (or the end surface) 52 of the MEMS-based micro-reflector 50 rotates by a given angle A1. As will be appreciated, the drive voltage can be provided from any suitable drive component (not shown) external to the chip of the MEMS-based micro-reflector 50. The given angle A1 can be a tiny angle, which, as shown in FIG. 1B, drives or causes the reflected light beam to undergo a synchronous shift 101. In this way, the angling of the reflector 50 relative to the coaxially arranged lens 72 and optical pairs 10, 20 changes a propagation direction of the beam, causing a misalignment coupling loss to the beam and thereby regulating the attenuation of specific incident light. Thus, this shift 101 leads to a mismatch between a first mode field of the reflected light beam transmitted to an end surface 22 of the outgoing optical fiber 20 and a second mode field of the coupled outgoing optical fiber 20. The mismatch causes an attenuation of the reflected light beam to a certain degree. As the applied drive voltage changes, the given angle A1 changes, and the attenuation changes correspondingly and is continuously variable.

Figure 2:
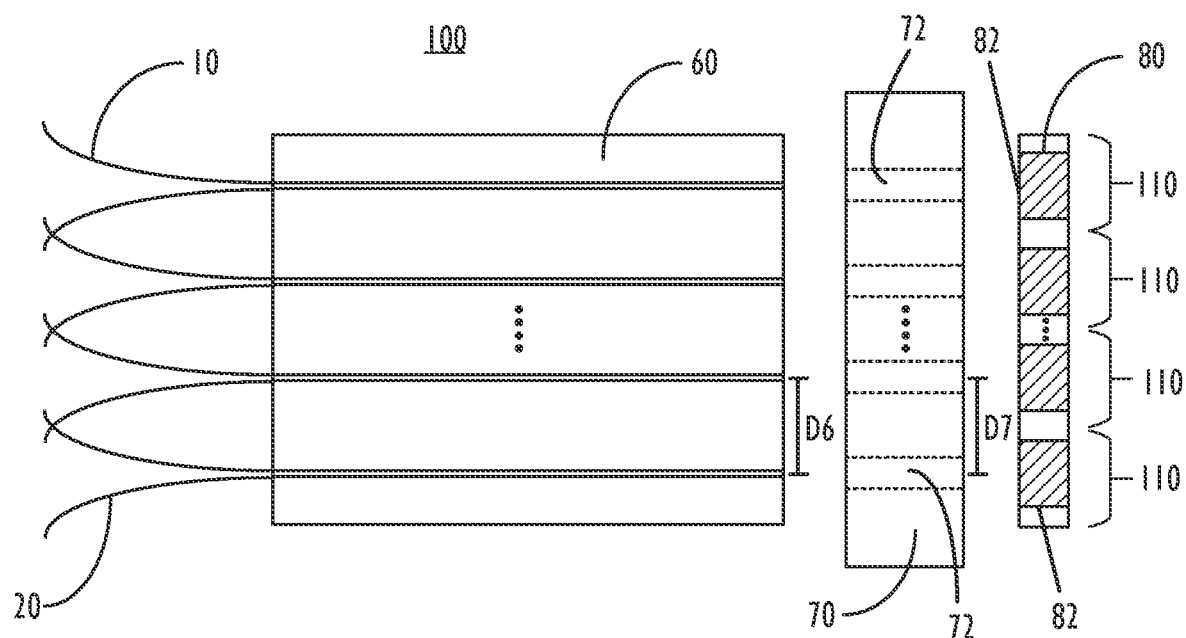
FIG. 2 illustrates a schematic structural diagram of a MEMS-based variable optical attenuator (VOA) array according to an embodiment of the present disclosure.

As disclosed below, several of such attenuation units 110 can be used together in MEMS-based variable optical attenuator (VOA) array 100 according to the present disclosure. For example, FIG. 2 is a schematic structural diagram of a MEMS-based variable optical attenuator (VOA) array 100 according to an embodiment of the present disclosure. As shown, the VOA array 100 sequentially includes an optical fiber array 60, a micro-lens array 70, and a MEMS-based micro-reflector array 80, which may be sequentially assembled to form an array 100 having a plurality of optical attenuation units 110.

Specifically, the MEMS-based VOA array 100 includes several optical attenuation units 110, which may be in an arrangement of a single row or may be in a multi-layer stacked arrangement. For example, in an arrangement of a single row, the optical attenuation units 110 may be arranged in one row and at least two columns, such as 1 by 2, 1 by 4, 1 by 8, 1 by 12, etc. In an arrangement of a single column, the optical attenuation units 110 may be arranged in at least two rows and in one column, such as 2 by 1, 4 by 1, 8 by 1, 12 by 1, etc. In a multi-layer stacked arrangement, the optical attenuation units 110 may be arranged in at least two rows and at least two columns, such as 2 by 2, 4 by 4, 2 by 4, 8 by 3, etc. These and other configurations for the array 100 can be used.

In some examples, the optical fibers 10, 20 in the optical fiber array 60 are bare optical fibers and are distributed in pairs. Each pair of optical fibers 10, 20 sequentially corresponds to the incoming optical fiber 10 and the outgoing optical fiber 20 for a single optical attenuation unit 110.

In some examples, lenses 72 in the micro-lens array 70 are distributed at equal distances, and a distance D7 between adjacent lenses 72 is equal to a distance D6 between adjacent optical-fibers pairs in the optical fiber array 60. Accordingly, each micro-lens 72 is coaxial with a corresponding pair of optical fibers 10, 20, which are used for achieving precise transmission of the incoming light and the outgoing light. In some examples, the micro-lenses 72 are cylindrical lenses, which may be G-lenses or C-lenses.

Figure 3:
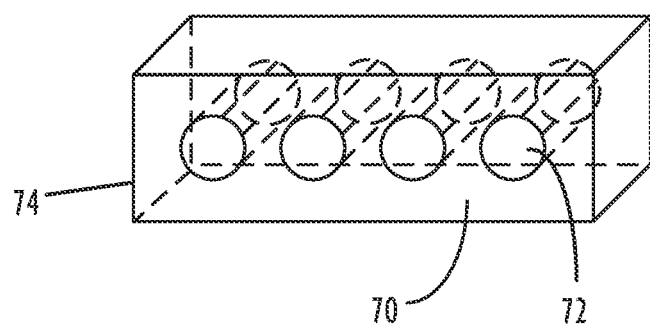
FIG. 3 illustrates a schematic structural diagram of an example micro-lens array according to various embodiments of the present disclosure.

By way of example, FIG. 3 illustrates a schematic structural diagram of the micro-lens array 70. The micro-lens array 70 includes multiple lenses 72 positioned in a positioning structure 74, which allows for high precision placement of the lenses 72. The positioning structure 74 of the micro-lens array 70 may be a stamped piece or structure, a silicon-based etched piece or structure, or an assembly obtained by using or including one more V-shaped grooves or other positioning devices.

As further shown in FIG. 2, the MEMS-based micro-reflector array 80 includes MEMS-based micro-reflectors 82, each including or being a MEMS chip. For example, each MEMS-based micro-reflector 82 may include or may be a MEMS chip, and surfaces of the MEMS chip may be used as reflection surfaces of the MEMS-based micro-reflectors 82. Each chip is used for one of the MEMS-based micro-reflectors 82 contained in the MEMS-based micro-reflector array 80. The MEMS chip of the MEMS-based micro-reflector 82 may include an independent drive circuit, which may provide differential modulation of a multi-channel communication network driven by different voltages. The micro-lens array 70 may precisely transmit N beams incoming from the optical fiber array 60 to central reflection regions of MEMS-based micro-reflectors 82, e.g., central reflection regions of the MEMS chips of MEMS-based micro-reflectors 82. In turn, the MEMS-based micro-reflectors 82 accurately transmit the reflected beams to corresponding outgoing optical fibers 20 according to preset angles, thereby reducing beam crosstalk and ensuring mutual independence among a plurality of device units 110 in the array 100. In some examples, N may be a positive integer.

Figure 4:
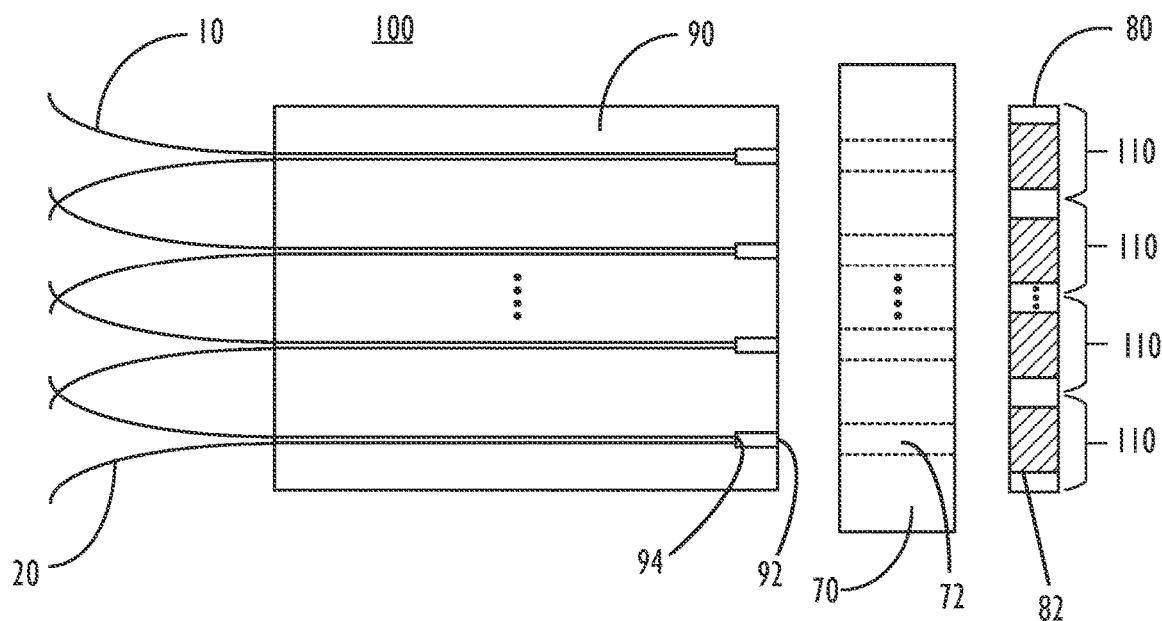
FIG. 4 illustrates a schematic structural diagram of another MEMS-based VOA array according to another embodiment of the present disclosure.

FIG. 4 illustrates a schematic structural diagram of another MEMS-based VOA array 100 according to another embodiment of the present disclosure. As shown, the variable VOA array 100, e.g., a complete variable VOA, includes a dual optical fiber pigtail array 90 (also referred to as a "dual optical fiber head array"), a micro-lens array 70, and a MEMS-based micro-reflector array 80 to form a plurality of optical attenuation units 110. A dual optical fiber pigtail 92, also referred to as a "dual optical fiber head," includes a glass structure 94 and an incoming optical fiber 10 and an outgoing optical fiber 20, and the glass structure 94 includes a pair of holes (e.g., capillaries) for the incoming optical fiber 10 and the outgoing optical fiber 20 to pass therethrough and for positioning the incoming optical fiber 10 and the outgoing optical fiber 20. The light path of the example of FIG. 4 is the same as or similar to the light path of the above-described example of FIG. 2. In contrast to the array 100 of FIG. 2, the optical fibers in the dual optical fiber pigtail array 90 of FIG. 4 are an array of dual optical fiber pigtails 92, rather than bare optical fibers in the example of FIG. 2.

In some embodiments of the present disclosure, a chip array, a micro-lens array, and an optical fiber array distributed coaxially and at equal distances may be included, e.g., sequentially included. For examples, an array of chips, an array of micro-lenses, and an array of optical fibers may be distributed coaxially and at equal distances, and may be included in a device consistent with the present disclosure. Accordingly, a MEMS-based VOA array 100 as disclosed herein may contain a relatively few types of device elements and may have a relatively few parameters that need to be tuned or debugged during the assembly of the array 100. Further, the assembly of arrayed elements may facilitate device-tuning in batches. Accordingly, automation in the assembly of the arrays 110 may be increased, and the production costs may be reduced.

Figure 5:
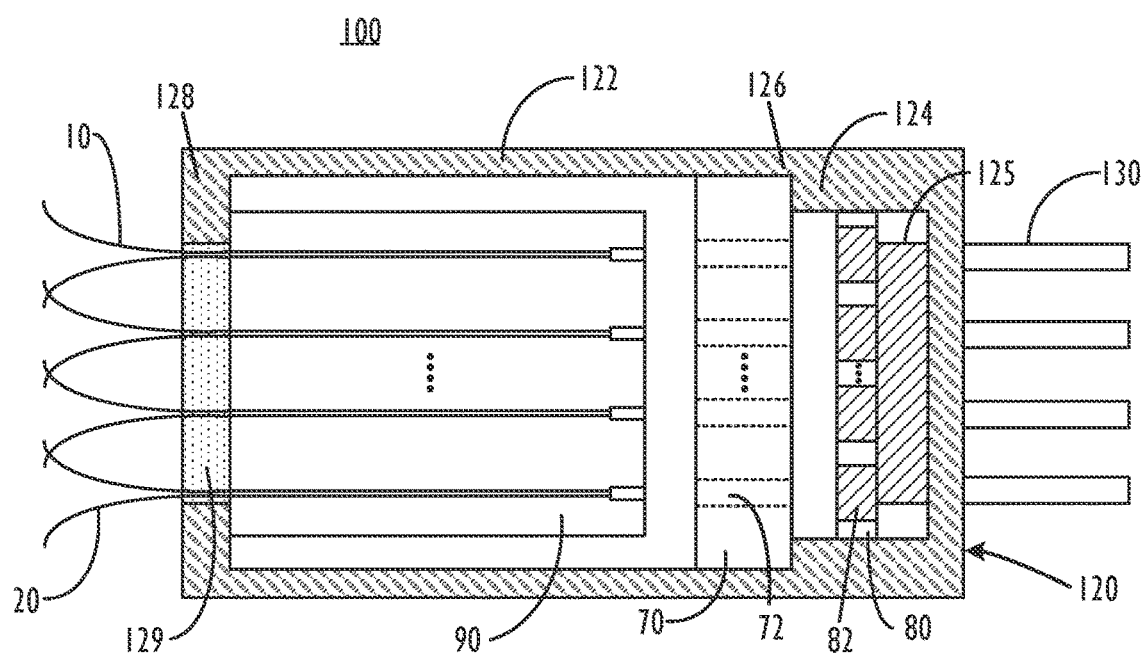
FIG. 5 illustrates a schematic diagram of yet another MEMS-based VOA array including an encapsulation structure according to various embodiments of the present disclosure.

An air-tight encapsulation may be used for fabricating a VOA array 100 of the present disclosure, such as the VOA array 100 in FIG. 4. In all embodiments, or alternatively in one embodiment, or alternatively in at least one embodiments of the present disclosure, encapsulation in the mode shown in the example of FIG. 5 is performed. In the present disclosure, the VOA array 100 may be tuned in batches and assembled inside encapsulation structures.

The component arrays, such as the dual optical fiber pigtail array 90, the micro-lens array 70, and the MEMS-based micro-reflector array 80, can be assembled or tuned in batches, without the need to assemble separate components (such as individual lens, individual optical fiber pigtails, individual MEMS-based micro-reflector) one by one. Accordingly, the assembling process may be simplified.

As shown in FIG. 5, the encapsulation structure 120 includes an outer encapsulation tube or housing 122 and a base 124. One end 126 of the outer encapsulation housing 122 is integrally connected with the base 124, and another end 128 of the outer encapsulation housing 122 is formed with a through-hole 129 for incoming optical fibers 10 and outgoing optical fibers 20 to pass through. The outside of the base 124 is fixed with several groups of PINs 130, and each group of PINs 130 are connected to a MEMS chip of a MEMS-based micro-reflector 82 in the MEMS-based micro-reflector array 80 via gold wires and used for providing a drive voltage for the MEMS chip of the MEMS-based micro-reflector 82, so as to achieve angle changes of the reflective MEMS-based micro-reflector 82. A material of the base 124 may include ceramic or other insulative materials. A buffer gasket 125 is provided on an inner side of the base 124, and the buffer gasket 125 provides protection against vibration and shock for the MEMS-based micro-reflector array 80. Gold-tin soldering, electric resistance welding, or adhesive bonding may be used to connect (or couple) one end 126 of the outer encapsulation housing 122 to the base 124 to assemble the two integrally into one piece. The through-hole 129 on another end 128 of the outer encapsulation housing 122 is encapsulated with adhesive.

In some examples, distances between adjacent optical attenuation units 110 in a MEMS-based VOA array 100 of the present disclosure are the same, along a row direction and/or a column direction. This uniform arrangement is preferred to facilitate assembly of the MEMS-based VOA array 100 during manufacture. In other examples, some or all of the distances between adjacent optical attenuation units 110 in a MEMS-based VOA array 100 of the present disclosure can be different, and in each individual optical attenuation unit 110, the pair of optical fibers 10, 20 or the dual optical fiber pigtail is aligned coaxially with the micro-lens 72 and the micro-reflector 82.

Figure 6:
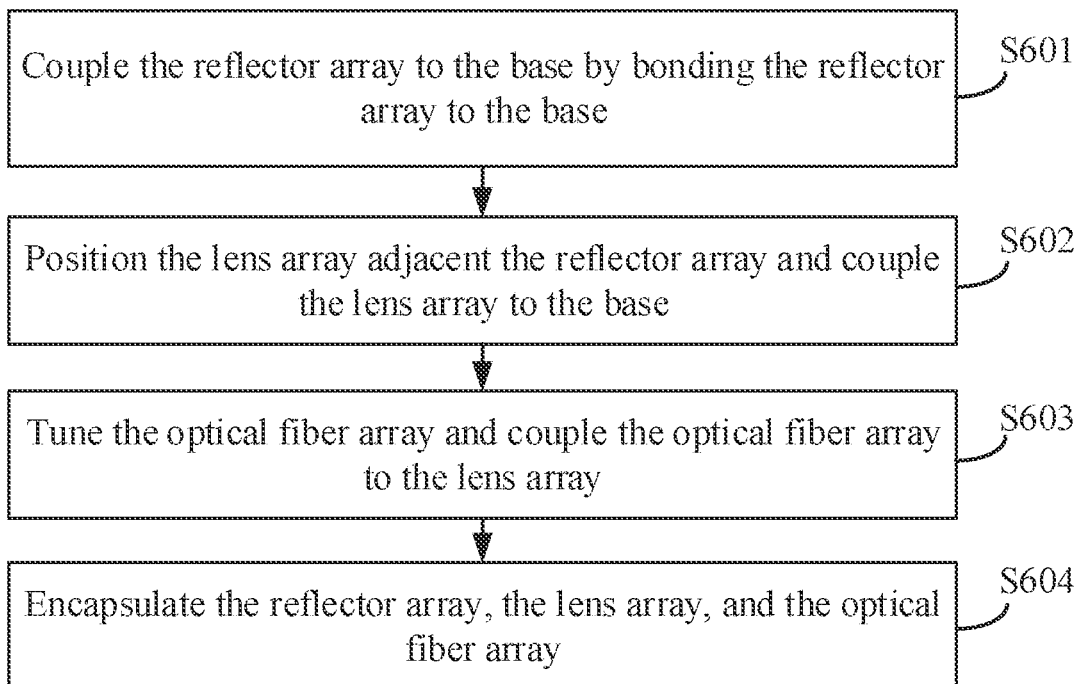
FIG. 6 illustrate a flowchart of an example method of assembling a variable optical attenuator (VOA) device.

FIG. 6 illustrate a flowchart of an example method 600 of assembling a variable optical attenuator (VOA) device to attenuate optical signals. The method 600 is described below with reference to FIGS. 5 and 6.

At S601, the reflector array 80 is coupled to the base 124 by bonding the reflector array 80 to the base 124. In some examples, the reflector array 80 has reflectors, each including or being a micro-electromechanical systems (MEMS) chip, and each MEMS chip is configured to position or control a respective reflector. In some examples, a buffer gasket may be positioned between the reflector array 80 and the base 124, by bonding the buffer gasket 125 to the base 124, and further bonding the reflector array 80 to the buffer gasket 125. In some examples, each of the MEMS chips may be electrically connected to a pin disposed in the base 124.

At S602, the lens array 70 is positioned adjacent the reflector array 80 and coupled to the base 124 by bonding the lens array 70 to the base 124. For example, the lens array 80 may be aligned with the reflector array 80, and the lens array 80 may be bonded to a shoulder of the base 124. The lens array 70 may have a plurality of lenses 72 each disposed in optical communication with a respective one of the reflector 82.

At S603, the optical fiber array is tuned, and further coupled to the lens array 70 by bonding. For examples, the optical fiber array (e.g., a dual optical fiber pigtail array 90) has a plurality of optical pairs each having an input and an output, and can be positioned adjacent the lens array 70, and can be tuned in a batch. In some examples, the optical fibers of the optical fiber array can be tuned together, e.g., so as to align the optical fiber array with the lens array 70. With the optical fiber array tuned, the optical fiber array may be bonded to the lens array 70 by, e.g., providing adhesive on sides of the optical fiber array and the lens array 70.

At S604, the reflector array 80, the lens array 70, and the optical fiber array are encapsulated. The reflector array 80, the lens array 70, and the optical fiber array may be encapsulated by connecting the housing 122 to the base 124 and by filling the through-hole 129 with adhesive.

In some examples, the lens array 70 may be constructed by installing lenses 72 into a stamped structure, a silicon-based etched structure, or a positioning device. In some examples, the optical fiber array 70 may be constructed by positioning pairs of bare optical fibers in a positioning device or positioning optical fibers in pairs of capillaries of a glass structure.

Implementations of the present invention have been described above with reference to the accompanying drawings, but the present invention is not limited to the above-described specific embodiments, which are illustrative, rather than limiting the present invention. Those of ordinary skills in the art should understand that they may still modify the technical solutions recited in the above-described embodiments or perform equivalent substitutions on part or all of the technical features thereof. Such modifications or substitutions do not cause the essence of corresponding technical solutions to depart from the scope of the technical solutions in the embodiments of the present invention, but shall all fall within the scope of the present invention.

The term "couple" or similar expression means either an indirect or direct connection. If device A is coupled to device B, that connection may be through a direct connection or through an indirect connection via other devices and connections.

The present disclosure may be embodied in other specific forms without departing from its spirit or essential characteristics. The described embodiments are to be considered in all respects only as illustrative and not restrictive.

What is claimed is:

1. A variable optical attenuator (VOA) device, comprising:
    a reflector array having a plurality of reflectors;
    a lens array adjacent the reflector array, the lens array having a plurality of lenses installed in a lens positioning structure, each of the lenses disposed in optical communication with a respective one of the reflectors; and
    a fiber positioning device adjacent the lens array, the fiber positioning device having a plurality of optical pairs of an optical fiber array positioned therein.

2. The VOA device of claim 1, wherein each of the optical pairs have an input and an output and are configured to communicate optical signals with a respective one of the lenses of the lens array.

3. The VOA device of claim 2, wherein each of the plurality of reflectors is configured to attenuate the optical signals from the input to the output of the respective optical pair.

4. The VOA device of claim 1, wherein each of the reflectors having a micro-electromechanical systems (MEMS) chip configured to position a respective one of the plurality of reflectors.

5. The VOA device of claim 1, wherein each respective optical pair, lens, and reflector are disposed coaxial with one another.

6. The VOA device of claim 1, wherein each of the optical pairs of the optical fiber array comprises one of (i) an incoming optical fiber and an outgoing optical fiber, (ii) a pair of bare optical fibers; and (iii) an optical fiber pigtail having the optical pairs passing through a pair of capillaries.

7. The VOA device of claim 1, wherein each of the plurality of lenses of the lens array comprises a cylindrical micro-lens.

8. The VOA device of claim 1, wherein the lens positioning structure comprises one of (i) a stamped structure having the plurality of lenses installed therein, (ii) a silicon-based etched structure having the plurality of lenses installed therein, and (iii) a lens positioning device having the plurality of lenses installed therein.

9. The VOA device of claim 1, comprising a base supporting the reflector array, the lens array, and the fiber positioning device.

10. The VOA device of claim 9,
    wherein the reflector array is bonded adjacent a surface of the base, and
    wherein the lens array is bonded to a shoulder of the base offset from the surface.

11. The VOA device of claim 9, comprising a housing extending from the base and enclosing the fiber positioning device, the lens array, and the reflector array therein.

12. The VOA device of claim 11, wherein the housing comprises a through-hole opposite the base for passage of a portion of the optical fiber array into the housing.

13. The VOA device of claim 11, wherein the plurality of optical pairs and the respective reflectors are arranged in one or more columns and in one or more rows.

14. An optical system, comprising:
    an array of reflectors;
    an array of lenses adjacent the array of reflectors; and
    an array of optical fibers adjacent to the array of lenses,
    wherein the lenses of the array of lenses are positioned in a lens positioning structure in optical communication with one of the reflectors of the array of reflectors, and
    wherein the array of optical fibers includes a plurality of optical pairs positioned in a fiber positioning device.

15. The optical system of claim 14, wherein each respective optical pair, lens, and reflector are disposed coaxial with one another.

16. The optical system of claim 14, wherein the plurality of optical pairs and respective reflectors of the array of reflectors are arranged in one or more columns and in one or more rows.

17. The optical system of claim 14, wherein each of the optical pairs of the array of optical fibers comprises one of (i) an incoming optical fiber and an outgoing optical fiber, (ii) a pair of bare optical fibers; and (iii) an optical fiber pigtail having the optical pairs passing through a pair of capillaries.

18. The optical system of claim 14, wherein each of the reflectors of the array of reflectors comprises a micro-electromechanical systems (MEMS) chip configured to position the reflector.

19. The optical system of claim 14, wherein each lens of the array of lenses array comprises a cylindrical micro-lens.

20. The optical system of claim 14, comprising:
- a base supporting the array of reflectors array, the array of lenses, and the fiber positioning device; and
- a housing extending from the base and enclosing the fiber positioning device, the array of lenses, and the array of reflectors,
- wherein the housing comprises a through-hole opposite the base for passage of a portion of the array of optical fibers into the housing.

\* \* \* \* \*